(12) United States Patent
Alperin et al.

(10) Patent No.: US 8,320,535 B2
(45) Date of Patent: *Nov. 27, 2012

(54) SELECTABLE GREETING MESSAGES

(75) Inventors: Jordan Alperin, Denver, CO (US); Rich Cerami, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 1068 days.

This patent is subject to a terminal disclaimer.

(21) Appl. No.: 11/400,616

(22) Filed: Apr. 6, 2006

(65) Prior Publication Data

US 2007/0263791 A1    Nov. 15, 2007

(51) Int. Cl.
*H04M 11/00* (2006.01)
(52) U.S. Cl. ............... 379/88.14; 379/88.17; 379/88.18
(58) Field of Classification Search ................... 707/10; 709/201–202; 379/88.21–88.25; 705/2–6
See application file for complete search history.

(56) References Cited

U.S. PATENT DOCUMENTS

| | | | |
|---|---|---|---|
| 4,837,798 | A | 6/1989 | Cohen et al. |
| 5,406,557 | A | 4/1995 | Baudoin |
| 5,410,691 | A | 4/1995 | Taylor |
| 5,479,411 | A | 12/1995 | Klein |
| 5,524,137 | A | 6/1996 | Rhee |
| 5,633,484 | A | 5/1997 | Zancho et al. |
| 5,689,550 | A | 11/1997 | Garson et al. |
| 5,724,410 | A | 3/1998 | Parvulescu et al. |
| 5,742,905 | A | 4/1998 | Pepe et al. |
| 5,920,835 | A | 7/1999 | Huzenlaub et al. |
| 5,937,162 | A | 8/1999 | Funk et al. |
| 5,974,449 | A | 10/1999 | Chang et al. |
| 6,014,429 | A | 1/2000 | LaPorta et al. |
| 6,081,830 | A | 6/2000 | Schindler |
| 6,094,681 | A | 7/2000 | Shaffer et al. |
| 6,154,772 | A | 11/2000 | Dunn et al. |
| 6,173,259 | B1 | 1/2001 | Bijl et al. |
| 6,345,279 | B1 | 2/2002 | Li et al. |
| 6,353,827 | B1 | 3/2002 | Davies et al. |
| 6,366,651 | B1 | 4/2002 | Griffith et al. |
| 6,385,611 | B1 | 5/2002 | Cardona et al. |
| 6,407,680 | B1 | 6/2002 | Lai et al. |

(Continued)

FOREIGN PATENT DOCUMENTS

WO      WO 97/23082      6/1997

OTHER PUBLICATIONS

U.S. Appl. No. 11/228,446, filed Sep. 15, 2005, Jordan Alperin.

(Continued)

*Primary Examiner* — Yuwen Pan
*Assistant Examiner* — Assad Mohammed
(74) *Attorney, Agent, or Firm* — Swanson & Bratschun, L.L.C.

(57) ABSTRACT

Systems, methods, and machine-readable media are disclosed to provide selectable greetings or responses to a request to initiate a communication. In one embodiment, a method of providing selectable greetings in response to a request to initiate a communication can comprise receiving the request to initiate a communication from an initiating device. The request can identify an intended recipient device. A greeting can be selected from a set of pre-determined greetings in user profile information from a user of the recipient device. A response message to the initiating device can be generated where the response message indicates the selected greeting. The response message can be sent to the initiating device.

27 Claims, 7 Drawing Sheets

U.S. PATENT DOCUMENTS

| | | | |
|---|---|---|---|
| 6,421,733 B1 | 7/2002 | Tso et al. | |
| 6,438,221 B1 | 8/2002 | Lee et al. | |
| 6,442,589 B1 | 8/2002 | Takahashi et al. | |
| 6,442,606 B1 | 8/2002 | Subbaroyan et al. | |
| 6,459,776 B1* | 10/2002 | Aktas et al. | 379/88.13 |
| 6,463,463 B1 | 10/2002 | Godfrey et al. | |
| 6,483,899 B2 | 11/2002 | Agraharam et al. | |
| 6,556,217 B1 | 4/2003 | Makipaa et al. | |
| 6,564,264 B1 | 5/2003 | Creswell et al. | |
| 6,631,181 B1* | 10/2003 | Bates et al. | 379/88.18 |
| 6,675,261 B2 | 1/2004 | Shandony | |
| 6,694,004 B1 | 2/2004 | Knoerle et al. | |
| 6,754,904 B1 | 6/2004 | Cooper et al. | |
| 6,768,789 B1* | 7/2004 | Wilk | 379/67.1 |
| 6,775,658 B1 | 8/2004 | Zothner | |
| 6,782,253 B1 | 8/2004 | Shteyn et al. | |
| 6,799,174 B2 | 9/2004 | Chipman et al. | |
| 6,801,793 B1 | 10/2004 | Aarnio et al. | |
| 6,816,582 B2 | 11/2004 | Levine | |
| 6,826,173 B1 | 11/2004 | Kung et al. | |
| 6,826,407 B1 | 11/2004 | Helferich | |
| 6,832,259 B2 | 12/2004 | Hymel et al. | |
| 6,832,377 B1 | 12/2004 | Havemose | |
| 6,879,838 B2 | 4/2005 | Rankin et al. | |
| 6,882,709 B1* | 4/2005 | Sherlock et al. | 379/90.01 |
| 6,938,087 B1 | 8/2005 | Abu-Samaha | |
| 6,964,014 B1 | 11/2005 | Parish | |
| 6,977,993 B2* | 12/2005 | Starbuck et al. | 379/88.21 |
| 6,988,128 B1 | 1/2006 | Alexander et al. | |
| 7,013,331 B2 | 3/2006 | Das | |
| 7,069,301 B2 | 6/2006 | Jerbi et al. | |
| 7,069,309 B1 | 6/2006 | Dodrill et al. | |
| 7,072,056 B1* | 7/2006 | Greaves et al. | 358/1.15 |
| 7,076,734 B2 | 7/2006 | Wolff et al. | |
| 7,106,473 B2 | 9/2006 | Sekiguchi | |
| 7,120,870 B1 | 10/2006 | Nakamura | |
| 7,188,073 B1 | 3/2007 | Tam et al. | |
| 7,212,543 B1 | 5/2007 | Arwald et al. | |
| 7,212,614 B1 | 5/2007 | Burg et al | |
| 7,219,163 B2 | 5/2007 | Robinson et al. | |
| 7,224,774 B1 | 5/2007 | Brown et al. | |
| 7,272,662 B2 | 9/2007 | Chesnais et al. | |
| 7,277,529 B1* | 10/2007 | Wuthnow et al. | 379/88.14 |
| 7,295,752 B1 | 11/2007 | Jain et al. | |
| 7,310,329 B2 | 12/2007 | Vieri et al. | |
| 7,343,371 B2 | 3/2008 | Ibuki et al. | |
| 7,383,308 B1 | 6/2008 | Groves et al. | |
| 7,385,875 B2 | 6/2008 | May et al. | |
| 7,526,572 B2 | 4/2009 | Omar et al. | |
| 7,551,727 B2 | 6/2009 | Howell et al. | |
| 7,587,033 B2 | 9/2009 | Crago et al. | |
| 7,596,369 B2 | 9/2009 | Alperin et al. | |
| 7,688,962 B1 | 3/2010 | Knoerie et al. | |
| 8,078,476 B2 | 12/2011 | Alperin et al. | |
| 8,095,664 B2 | 1/2012 | Yamaguchi et al. | |
| 2002/0026457 A1* | 2/2002 | Jensen | 707/501.1 |
| 2002/0032589 A1* | 3/2002 | Shah | 705/6 |
| 2002/0075519 A1 | 6/2002 | Konsella et al. | |
| 2002/0076027 A1* | 6/2002 | Bernnan et al. | 379/211.01 |
| 2002/0082030 A1 | 6/2002 | Berndt et al. | |
| 2002/0087704 A1 | 7/2002 | Chesnais et al. | |
| 2002/0098831 A1 | 7/2002 | Castell et al. | |
| 2002/0102965 A1 | 8/2002 | Mandahl et al. | |
| 2002/0111991 A1 | 8/2002 | Wood et al. | |
| 2002/0120451 A1 | 8/2002 | Kato et al. | |
| 2002/0128036 A1 | 9/2002 | Yach et al. | |
| 2002/0144273 A1 | 10/2002 | Reto | |
| 2002/0156871 A1 | 10/2002 | Munarriz et al. | |
| 2002/0169823 A1 | 11/2002 | Coulombe et al. | |
| 2002/0170067 A1 | 11/2002 | Norstrom et al. | |
| 2002/0174194 A1 | 11/2002 | Mooney et al. | |
| 2003/0041058 A1 | 2/2003 | Ibuki et al. | |
| 2003/0088633 A1 | 5/2003 | Chiu et al. | |
| 2003/0097262 A1 | 5/2003 | Nelson | |
| 2003/0120717 A1 | 6/2003 | Callaway et al. | |
| 2003/0147369 A1 | 8/2003 | Singh et al. | |
| 2003/0149646 A1 | 8/2003 | Chen et al. | |
| 2003/0172139 A1 | 9/2003 | Srinivasan et al. | |
| 2003/0172175 A1 | 9/2003 | McCormack et al. | |
| 2004/0044663 A1 | 3/2004 | Horompoly | |
| 2004/0054719 A1 | 3/2004 | Daigle et al. | |
| 2004/0058673 A1 | 3/2004 | Whynot et al. | |
| 2004/0075698 A1 | 4/2004 | Gao et al. | |
| 2004/0091089 A1 | 5/2004 | Wynn | |
| 2004/0170155 A1 | 9/2004 | Omar et al. | |
| 2004/0199665 A1 | 10/2004 | Omar et al. | |
| 2004/0236753 A1 | 11/2004 | Pocari | |
| 2004/0268265 A1 | 12/2004 | Berger | |
| 2005/0015311 A1 | 1/2005 | Frantz et al. | |
| 2005/0015443 A1 | 1/2005 | Levine et al. | |
| 2005/0018653 A1 | 1/2005 | Phillips et al. | |
| 2005/0033806 A1 | 2/2005 | Harvey et al. | |
| 2005/0037762 A1 | 2/2005 | Gurbani et al. | |
| 2005/0053206 A1 | 3/2005 | Chingon et al. | |
| 2005/0075097 A1 | 4/2005 | Lehikoinen et al. | |
| 2005/0086282 A1 | 4/2005 | Anderson et al. | |
| 2005/0089149 A1* | 4/2005 | Elias | 379/88.13 |
| 2005/0091327 A1 | 4/2005 | Koch | |
| 2005/0101343 A1 | 5/2005 | Hsiao | |
| 2005/0144557 A1 | 6/2005 | Li et al. | |
| 2005/0201533 A1* | 9/2005 | Emam et al. | 379/88.19 |
| 2005/0235307 A1 | 10/2005 | Relan et al. | |
| 2005/0246666 A1 | 11/2005 | Kalinoski et al. | |
| 2005/0254635 A1* | 11/2005 | Koretsky et al. | 379/142.08 |
| 2005/0262542 A1 | 11/2005 | DeWeese et al. | |
| 2006/0017983 A1 | 1/2006 | Syri et al. | |
| 2006/0026302 A1 | 2/2006 | Bennet et al. | |
| 2006/0095868 A1 | 5/2006 | Sawada et al. | |
| 2006/0104293 A1 | 5/2006 | Kopp et al. | |
| 2006/0104430 A1 | 5/2006 | Kirkland et al. | |
| 2006/0104431 A1 | 5/2006 | Emery et al. | |
| 2006/0123082 A1 | 6/2006 | Digate et al. | |
| 2006/0156251 A1 | 7/2006 | Suhail et al. | |
| 2006/0168065 A1 | 7/2006 | Martin | |
| 2006/0184624 A1 | 8/2006 | Thukral | |
| 2006/0218575 A1 | 9/2006 | Blair | |
| 2006/0250991 A1 | 11/2006 | Jabri et al. | |
| 2006/0265397 A1 | 11/2006 | Bryan et al. | |
| 2006/0265427 A1 | 11/2006 | Cohen et al. | |
| 2007/0016643 A1 | 1/2007 | Boss et al. | |
| 2007/0079010 A1 | 4/2007 | Heredia et al. | |
| 2007/0097394 A1 | 5/2007 | Zaima et al. | |
| 2007/0104184 A1* | 5/2007 | Ku et al. | 370/352 |
| 2007/0139513 A1 | 6/2007 | Fang | |
| 2007/0174448 A1 | 7/2007 | Ahuja et al. | |
| 2007/0198648 A1 | 8/2007 | Allen et al. | |
| 2007/0239833 A1 | 10/2007 | Alperin et al. | |
| 2007/0239880 A1 | 10/2007 | Alperin et al. | |
| 2007/0239895 A1 | 10/2007 | Alperin et al. | |
| 2008/0177616 A1 | 7/2008 | Nemirofsky et al. | |
| 2011/0167122 A1 | 7/2011 | Groves et al. | |

OTHER PUBLICATIONS

U.S. Appl. No. 11/255,089, filed Oct. 19, 2005, Jordan Alperin et al.
U.S. Appl. No. 11/266,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
U.S. Appl. No. 11/400,643, Office Action dated Oct. 14, 2010, 19 pages.
U.S. Appl. No. 11/399,097, Office Action dated Jan. 11, 2011, 11 pages.
Ashok Hariharan, "DHTML Text Marker—An Experiment," Jul. 2002, evolt.org, http://evolt.org/node/29028, 8 pages.
Vic Phillips, web site "http://homepgae.ntlworld.com/vwphillips/SearchForText.htm" titled "JavaScript Code for Search for Text", Jan. 15, 2006, 5 pages.

Chris McC, "Determining if span/div is visible or not," Jun. 2004, JavaScript and AJAX Forum, http://www.webmasterworld.com/forum91/1935.htm, 4 pages.

Alan Koontz, "Find in Page Script", Jun. 2003, Dynamic Drive, http://www.dynamicdrive.com/dynamicindex11/findpage.htm, 7 pages.

U.S. Appl. No. 11/228,446, Office Action dated Feb. 22, 2011, 20 pages.

U.S. Appl. No. 11/399,096, Final Office Action dated Feb. 11, 2011, 15 pages.

U.S. Appl. No. 11/266,011, Final Office Action dated Feb. 4, 2011, 25 pgs.

U.S. Appl. No. 11/399,585, Final Office Action dated Feb. 8, 2011, 23 pages.

Koontz, Alan "Find in Page Script", Oct. 13, 1969, Dynamic Drive, "http:/www.dynamicdrive.com/dynamicindex11/findpage.htm", 2 pages.

The Web Design Resource, "Manipulating Font Size and Color", Jun. 27, 1998, The Web Design Resource, 2 pages.

U.S. Appl. No. 11/228,446, Advisory Action dated Jan. 8, 2009 , 3 pages.

U.S. Appl. No. 11/228,446, Advisory Action dated Oct. 1, 2009, 3 pages.

U.S. Appl. No. 11/228,446, Final Office Action dated May 18, 2010, 15 pages.

U.S. Appl. No. 11/228,446, Final Office Action dated Jul. 24, 2009, 11 pages.

U.S. Appl. No. 11/228,446, Final Office Action dated Oct. 24, 2008 , 6 pages.

U.S. Appl. No. 11/228,446, Office Action dated Jan. 4, 2010, 17 pages.

U.S. Appl. No. 11/228,446, Office Action dated Jun. 3, 2008 , 13 pages.

U.S. Appl. No. 11/228,446, Office Action dated Mar. 3, 2009 , 12 pages.

U.S. Appl. No. 11/255,089, Final Office Action dated Sep. 24, 2009.

U.S. Appl. No. 11/255,089, Appeal Brief dated Apr. 26, 2010, 17 pages.

U.S. Appl. No. 11/255,089, Advisory Action dated Dec. 15, 2009, 3 pages.

U.S. Appl. No. 11/255,089, Office Action dated Mar. 10, 2009, 17 pages.

U.S. Appl. No. 11/255,089, Office Action dated Oct. 8, 2008, 18 pages.

U.S. Appl. No. 11/266,011, Office Action dated Dec. 22, 2008, 12 pages.

U.S. Appl. No. 11/266,011, Office Action dated Aug. 19, 2010, 19 pages.

U.S. Appl. No. 11/266,011, Advisory Action dated Apr. 23, 2010, 2 pages.

U.S. Appl. No. 11/266,011, Office Action dated Jun. 10, 2009, 12 pages.

U.S. Appl. No. 11/266,011, Final Office Action dated Jan. 28, 2010, 11 pages.

U.S. Appl. No. 11/292,801, Office Action dated Mar. 3, 2009, 9 pages.

U.S. Appl. No. 11/293,028, Advisory Action dated Jul. 6, 2009, 19 pages.

U.S. Appl. No. 11/293,028, Advisory Action dated May 23, 2008., 3 pages.

U.S. Appl. No. 11/293,028, Final Office Action dated Apr. 15, 2009, 12 pages.

U.S. Appl. No. 11/293,028, Final Office Action dated Mar. 17, 2008, 11 pages.

U.S. Appl. No. 11/293,028, Office Action dated Aug. 13, 2008, 9 pages.

U.S. Appl. No. 11/293,028, Office Action dated Nov. 14, 2007, 11 pages.

U.S. Appl. No. 11/293,028, Notice of Allowance dated Oct. 30, 2009, 16 pages.

U.S. Appl. No. 11/399,096, Final Office Action dated Jun. 17, 2009, 11 pages.

U.S. Appl. No. 11/399,096, Office Action dated Dec. 7, 2009 , 10 pages.

U.S. Appl. No. 11/399,096, Office Action dated Jan. 22, 2009, 14 pages.

U.S. Appl. No. 11/399,096, Final Office Action dated May 24, 2010, 12 pages.

U.S. Appl. No. 11/399,098, Notice of Allowance dated Jun. 2, 2009, 6 pages.

U.S. Appl. No. 11/399,098, Office Action dated Aug. 25, 2008, 13 pages.

U.S. Appl. No. 11/399,098, Terminal Disclaimer dated Nov. 25, 2008, 1 page.

U.S. Appl. No. 11/399,098, Requirement for Election/Restriction dated Feb. 25, 2009, 6 pages.

U.S. Appl. No. 11/399,098, Response to Requirement for Election/Restriction dated Mar. 11, 2009, 10 pages.

U.S. Appl. No. 11/399,585, Office Action dated Mar. 24, 2009, 16 pages.

U.S. Appl. No. 11/399,585, Advisory Action dated Jan. 25, 2010, 3 pages.

U.S. Appl. No. 11/399,585, Final Office Action dated Nov. 4, 2009, 10 pages.

U.S. Appl. No. 11/399,585, Non-Final Office Action dated Sep. 21, 2010, 15 pages.

U.S. Appl. No. 11/400,643, Final Office Action dated Jul. 27, 2009, 18 pages.

U.S. Appl. No. 11/400,643, Office Action dated Jan. 9, 2009, 17 pages.

U.S. Appl. No. 11/400,643, Advisory Action dated Jan. 19, 2009, 3 pages.

U.S. Appl. No. 11/400,644, Office Action dated Jan. 21, 2009, 16 pages.

WWW.COMCAST.NET/STORAGE, "Comcast on Line Storage", 2005, Published in: US, Internet Website, 1 page.

WWW.IBACKUP.COM,. "Flexible Storage Solutions for the Internet Age", Nov. 2005, Published in: US, Internet Website, 1 page.

WWW.MYDOCSONLINE, "File and Data Storage", Nov. 2005, Published in: US, Internet Website, 2 pages.

WWW.STREAMLOAD.COM, "Streamload—Freedom for Your Digital Lifestyle", Nov. 2005, Published in: US, Internet Website, 1 page.

WWW.XDRIVE.COM, "Secure on Line Storage", Nov. 2005, Published in : US, Internet Website, 2 pages.

U.S. Appl. No. 11/399,096, Office Action dated Oct. 27, 2010, 11 pages.

U.S. Appl. No. 11/399,097, Final Office Action dated Sep. 1, 2010, 10 pages.

U.S. Appl. No. 11/399,097, Office Action dated Mar. 26, 2010, 12 pages.

U.S. Appl. No. 11/399,097, Requirement for Election/Restriction dated Jan. 26, 2010, 6 pages.

U.S. Appl. No. 11/399,097, Response to Requirement for Election/Restriction dated Feb. 22, 2010, 1 page.

U.S. Appl. No. 11/399,584, Examiner's Answer to Appeal Brief dated Jun. 22, 2009, 16 pages.

U.S. Appl. No. 11/399,584, Appeal Brief dated Mar. 12, 2009, 24 pages.

U.S. Appl. No. 11/399,584, Advisory Action dated Dec. 18, 2008, 3 pages.

U.S. Appl. No. 11/399,584, Final Office Action dated Sep. 12, 2008, 12 pages.

U.S. Appl. No. 11/399,584, Office Action dated Mar. 6, 2008, 10 pages.

U.S. Appl. No. 11/383,620, Office Action dated Nov. 9, 2010, 17 pages.

U.S. Appl. No. 11/383,620, Final Office Action dated Ma 14, 2010, 20 pages.

U.S. Appl. No. 11/383,620, Office Action dated Nov. 10, 2009, 15 pages.

U.S. Appl. No. 11/383,620, Office Action dated Apr. 2, 2009, 14 pages.

U.S. Appl. No. 11/400,643, Office Action dated Mar. 7, 2011, 21 pages.

Good Technology, Inc., (2005) "Goodlink Enterprise Edition 4.5," Published in: US, Product Brochure, 4 pages.

Suda, Brian et al., (2004) "Enhance Usability by Highlighting Search Terms," A List Apart, http://www.alistapart.com/articles/search-highlight, accessed on Feb. 12, 2011 4 pages.

U.S. Appl. No. 11/383,620, Final Office Action dated Mar. 28, 2011, 27 pages.

U.S. Appl. No. 11/399,096, Notice of Panel Decision from Pre-Appeal Brief Review dated May 20, 2011, 2 pages.

U.S. Appl. No. 11/228,446, Final Office Action dated Jun. 21, 2011, 35 pages.

Googlebar, "Googlebar Release," Mar. 17, 2005, http://googlebar.mozdev.org/releases.html, all pages including Bug 8938 details; 7 pages.

Surtell, "Google highlighting," Jan. 27, 2004, http://surtell.com/projects_code_google_highlighting.asp, 7 pages.

U.S. Appl. No. 11/400,643, Pre-Appeal Brief and Notice of Appeal dated Jun. 7, 2011, 6 pages.

U.S. Appl. No. 11/400,643; Non Final Office Action dated Jul. 28, 2011; 20 pages.

U.S. Appl. No. 11/399,097; Notice of Allowance dated Jul. 29, 2011; 20 pages.

U.S. Appl. No. 11/399,097; Notice of Allowance dated Aug. 23, 2011; 5 pages.

U.S. Appl. No. 11/399,096, Office Action dated Jul. 12, 2011; 14 pages.

U.S. Appl. No. 11/399,096, Notice of Panel Decision from Pre-Appeal Brief Review dated May 23, 2011, 2 pages.

U.S. Appl. No. 11/399,585, Office Action dated Jul. 18, 2011, 20 pages.

U.S. Appl. No. 11/400,643; Notice of Panel Decision dated Jul. 11, 2011; 2 pages.

U.S. Appl. No. 11/383,620, Non Final Office Action dated Aug. 31, 2011; 21 pages.

U.S. Appl. No. 11/399,097; Supplemental Notice of Allowability dated Oct. 20, 2011; 5 pages.

U.S. Appl. No. 11/266,011; Notice of Allowance dated Oct. 7, 2011; 18 pages.

U.S. Appl. No. 11/228,446; Examiner-Initiated Interview Summary dated Nov. 10, 2011; 2 pages.

U.S. Appl. No. 11/228,446; Interview Summary dated Nov. 28, 2011; 3 pages.

U.S. Appl. No. 11/228,446; Notice of Allowance dated Nov. 28, 2011; 17 pages.

U.S. Appl. No. 11/399,096; Final Office Action dated Dec. 6, 2011; 15 pages.

U.S. Appl. No. 11/399,585; Non Final Office Action dated Jan. 4, 2012; 19 pages.

U.S. Appl. No. 11/400,643 Notice of Allowance Dec. 27, 2011; 26 pages.

U.S. Appl. No. 11/399,097; Supplemental Notice of Allowability dated Oct. 31, 2011; 5 pages.

U.S. Appl. No. 11/383,620; Final Office Action dated Feb. 3, 2012; 18 pages.

U.S. Appl. No. 11/399,584; Decision on Appeal dated Feb. 9, 2012; 9 pages.

U.S. Appl. No. 11/400,643; Notice of Allowance dated Mar. 8, 2012; 14 pages.

U.S. Appl. No. 11/228,446; Issue Notification dated May 30, 2012; 1 page.

U.S. Appl. No. 11/266,011; Issue Notification Apr. 11, 2012; 1 page.

U.S. Appl. No. 11/388,585; Final Rejection dated May 1, 2012; 35 pages.

U.S. Appl. No. 11/400,643; Issue Notification dated Jun. 13, 2012; 1 page.

U.S. Appl. No. 11/399,584; Non-Final Rejection dated Sep. 19, 2012; 23 pages.

\* cited by examiner

SELECTABLE GREETING MESSAGES

CROSS REFERENCE TO RELATED APPLICATIONS

This application is related to co-pending U.S. patent application Ser. No. 11/255,089 entitled "Cross-Platform Support for a Variety of Media Types" filed Oct. 19, 2005, co-pending U.S. patent application Ser. No. 11/266,011 entitled "Cross-Platform Message Notification" filed Nov. 2, 2005, and co-pending U.S. patent application Ser. No. 11/292,801 entitled "Cross-Platform Redirection of Communications" filed Dec. 2, 2005 all of which are herein incorporated by reference.

BACKGROUND OF THE INVENTION

Embodiments of the present invention relate generally to communications networks and more particularly to providing selectable greetings or responses to a request to initiate a communication.

Today, it is very common, and probably the norm, for an individual to have and regularly use a number of communications devices of different types that communicate via a variety of different media. For example, an individual may, on a daily basis, use a number of different telephones such as a work line, a home line, one or more cell phones, etc. Additionally, this same individual may have and use a number of other communications devices and/or media such as one or more email accounts, one or more instant message accounts, etc. that are accessible through any of a number of different devices such as personal computers, various portable devices, and/or other network attached devices that communicate via the Internet or other network.

Some or even all of the device may provide for answering or responding to communications in a fixed manner. For example, each telephone may have associated therewith a voicemail box or account. Furthermore, each voicemail box or account can have a greeting or message to be played to a caller upon receipt of a call. Other types of devices or communication media may also provide for responding to communications in a fixed manner. For example, an email account may provide for fixed responses such as an "out-of-office" auto reply etc.

However, managing these fixed responses, especially between multiple devices or communications media can be burdensome. For example, if a user wants to change his voicemail greetings to indicate that he is unavailable today, he would have to change multiple greetings, i.e., one for each of his voicemail boxes. Furthermore, even if these greetings or messages could be commonly defined for multiple devices, there is no way for the user to define multiple possible greetings that can be selected automatically or interactively in response to a communication. For example, there is no way for a user to commonly define one greeting or message to be presented to one individual or group of individuals and another greeting or message to be presented to a different individual or group of individuals. So, for example, a user cannot define one greeting or message to be presented to business associates and another to be presented to friends and/or relatives. Hence, there is a need for methods and systems that allow for providing selectable greetings or responses to a request to initiate a communication.

BRIEF SUMMARY OF THE INVENTION

Systems, methods, and machine-readable media are disclosed to provide selectable greetings or responses to a request to initiate a communication. In one embodiment, a method of providing selectable greetings in response to a request to initiate a communication can comprise receiving the request to initiate a communication from an initiating device. The request can identify an intended recipient device. A greeting can be selected from a set of pre-determined greetings in user profile information from a user of the recipient device. A response message to the initiating device can be generated where the response message indicates the selected greeting. The response message can be sent to the initiating device.

According to one embodiment, selecting the greeting from the set of pre-determined greetings can be based on an identity of a user of the initiating device and, in some cases, can be also based on membership of the user of the initiating device in a group defined in the user profile information from the user of the recipient device. According to another embodiment, selecting the greeting from a set of pre-determined greetings can comprise selecting a plurality of possible greetings from the set of pre-determined greetings. In such a case, the method can further comprise, prior to generating the response message to the initiating device, providing notification of the request to the recipient device. The notification can include an indication of each of the plurality of the possible greetings. A selection of one of the plurality of the possible greetings can be received from the user of the recipient device and the response message to the initiating device can include an indication of the greeting selected by the user of the recipient device.

According to yet another embodiment, a system for providing selectable greetings in response to a request to initiate a communication can comprise a communications bus and a user profile database communicatively coupled with the communications bus. The user profile database can be adapted to maintain user profile information for a plurality of users. The system can further comprise an initiating end device communicatively coupled with the communications bus and adapted to send and receive common language messages via the communications bus, to translate common language messages received from the communications bus to a format specific to the end device based on the type, and to store user profile information in the user profile database. One of the common language messages can comprise the request to initiate a communication. The system can also have a recipient end device communicatively coupled with the communications bus and adapted to send and receive common language messages via the communications bus, to translate common language messages received from the communications bus to a format specific to the end device based on the type, and to store user profile information in the user profile database. A manager can be communicatively coupled with the communications bus. The manager can be adapted to receive the request to initiate a communication from the initiating end device and select a greeting from a set of pre-determined greetings in user profile information from a user of the recipient end device.

According to one embodiment, the manager can be further adapted to generate a response message to the initiating end device, the response message indicating the selected greeting, and send the response message to the initiating end device. In some cases the manager can select the greeting from the set of pre-determined greetings based on an identity of a user of the initiating end device. In such a case, the manager can also select the greeting from the set of pre-determined greetings based on membership of the user of the initiating end device in a group defined in the user profile information from the user of the recipient end device.

According to another embodiment, the manager can be further adapted to select a plurality of possible greetings from the set of pre-determined greetings. Furthermore, the manager can be adapted to provide notification of the request to the recipient end device. In such a case, the notification can include an indication of each of the plurality of the possible greetings. The manager can be further adapted to receive a selection of one of the plurality of the possible greetings from the user of the recipient end device, generate a response message to the initiating end device, wherein the response message includes an indication of the greeting selected by the user of the recipient end device, and send the response message to the initiating end device.

According to still another embodiment, a machine-readable medium can have stored thereon a series of instruction for which, when executed by a processor, cause the processor to provide selectable greetings in response to a request to initiate a communication by receiving the request to initiate a communication from an initiating device, the request identifying an intended recipient device. The request can identify an intended recipient device. A greeting can be selected from a set of pre-determined greetings in user profile information from a user of the recipient device. A response message to the initiating device can be generated where the response message indicates the selected greeting. The response message can be sent to the initiating device.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing selectable greetings or responses to a request to initiate a communication. Generally speaking, providing selectable greetings in response to a request to initiate a communication can comprise receiving the request to initiate a communication from an initiating device. The request, such as a phone call, email, etc., can identify an intended recipient device by for example, a phone number, address, etc. A greeting or response can be selected from a set of pre-determined messages. The greeting can be stored, for example, in user profile information from a user of the recipient device. A response message to the initiating device can be generated where the response message indicates the selected greeting. The response message can then be sent to the initiating device.

According to one embodiment, a greeting can be selected from a set of pre-determined greetings based on an identity of a user of the initiating device, i.e., based on who is calling or sending a communication. In some cases, selection can be also based on membership of the user of the initiating device in a group defined in the user profile information from the user of the recipient device. That is, selection of a greeting or message can be based on the caller or sender of the communication being, for example, a member of the recipient's "friends" group or "work" group as defined in the recipients profile information According to another embodiment, a plurality of possible greetings can be selected from the set of pre-determined greetings. In such a case, the method can further comprise, prior to generating the response message to the initiating device, providing notification of the request to the recipient device. The notification can include an indication of each of the plurality of the possible greetings. That is, a number of possible greetings or messages can be selected from greetings or messages defined in the recipients profile. A notification of an incoming communication can be sent to the recipient to inform him of the communication and provide, as options, the possible greetings or messages. A selection of one of the plurality of the possible greetings can be received from the user of the recipient device and the response message to the initiating device can include an indication of the greeting selected by the user of the recipient device. That is, the recipient selected greeting or message can be provided in response to the request.

Figure 1:
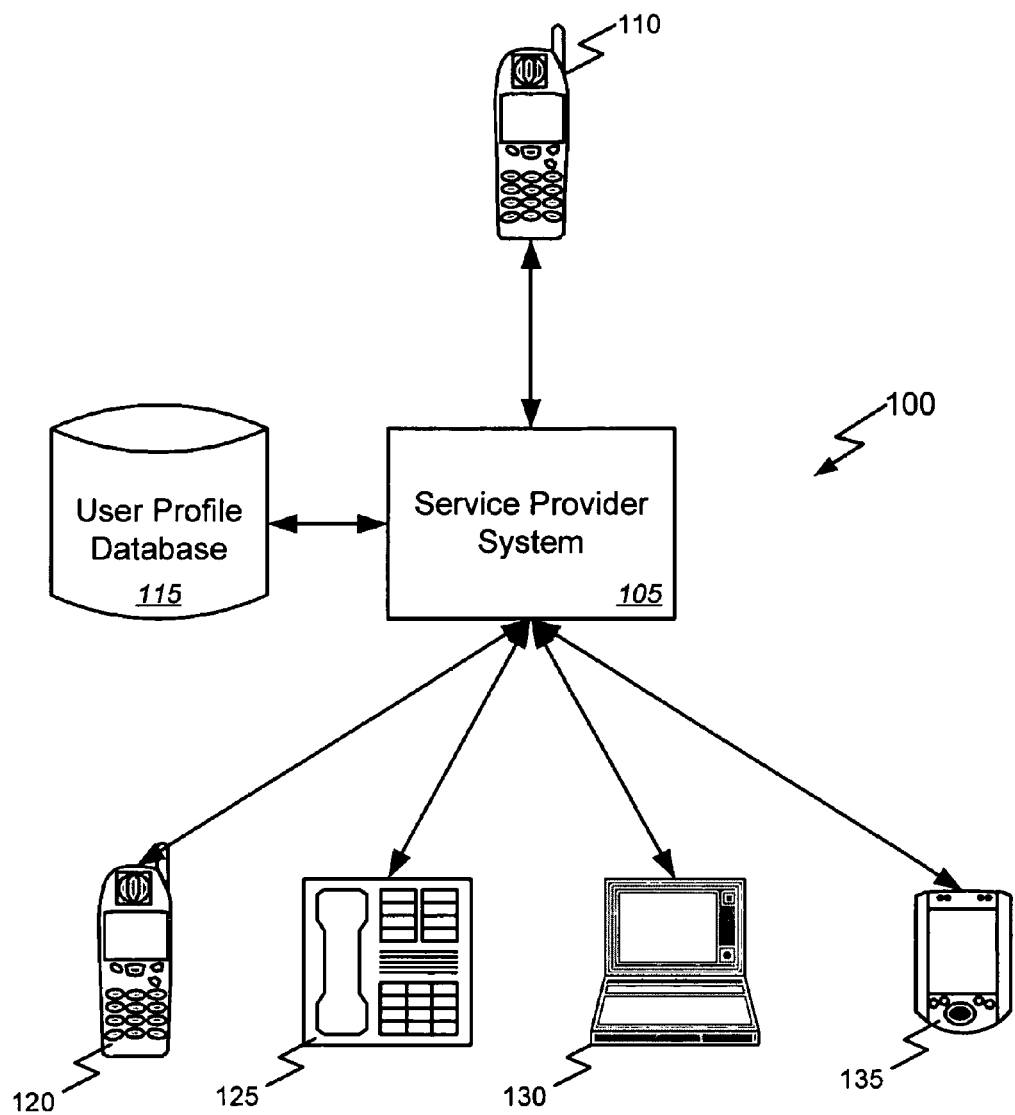
FIG. 1 is a block diagram illustrating, at a high-level, functional components of an architecture for providing selectable greetings in response to a request to initiate a communication according to one embodiment of the present invention.

FIG. 1 is a block diagram illustrating, at a high-level, functional components of an architecture for providing selectable greetings in response to a request to initiate a communication according to one embodiment of the present invention. In this example, the system 100 includes an initiating device 110 communicatively coupled with a service provider system 105. The service provider system 105 can be communicatively coupled with a user profile database 115 and a plurality of recipient devices 120-135. Generally speaking, the initiating device 110 can initiate a communication such as a telephone call to one of the recipient devices 120-135 through the service provider system 105.

Initiating device 110 can be any of a number of possible communication devices. While illustrated here as resembling a cell phone, initiating device can also be a land line telephone, a Personal Digital Assistant (PDA), any of a variety of wireless devices, a personal computer, etc. Regardless of the exact type of device, initiating device 110 can be communicatively coupled with service provider system 105 via typical communication media such as a cellular network, a land line telephone, a Local Area Network (LAN), Wide Area Network (WAN), the Internet, or other type of network. Through this communication media, initiating device 110 can send and receive communications to and from the service provider system 105.

Service provider system 105 can be one or more systems adapted to provide communication services of one or more types to the initiating device 110. For example, service provider system 105 can be a system providing cellular telephone services, land line telephone services, Internet services, etc. Service provider system 105 can be adapted to send and receive communications of an appropriate type to and from initiating device 110.

User profile database 115 can be communicatively coupled with service provider system 105 via a Local Area Network (LAN), Wide Area Network (WAN), the Internet, or other type of network or other communications media. While user profile database 115 is shown in this example as being separate from the service provider system 105, the user profile database may be internal or external to the service provider system 105 or may be part of and/or maintained by another system and may be either local to or remote from the service provider system 105. Regardless of the exact configuration, user profile database 115 maintains a set of user profile data or preferences for one or more users of the service provider system 105 such as a user of initiating device 110 and/or users of recipient devices 120-135. For example, the user profile database 115 may include information relating to call features such as call forwarding or other information relating to other types of communications such as email delivery options. Additionally or alternatively, user profile database 115 may include information defining one or more greetings or messages, such a voicemail greetings, email auto responses, etc., that can be used to reply to an incoming communication. Furthermore, such information may also include one or more possible initiators or callers, or groups of initiators or callers, and relate an individual or group to one or more possible greetings or messages.

Recipient devices 120-135 can be any of a number of possible communication devices. For example, recipient devices can be cell phones, land line telephones, Personal Digital Assistants (PDAs), any of a variety of wireless devices, Personal Computers (PCs), etc. Regardless of the exact types of devices, recipient devices 120-135 can be communicatively coupled with service provider system 105 via typical communication media such as a cellular network, a land line telephone, a Local Area Network (LAN), Wide Area Network (WAN), the Internet, and/or other types of networks. Through this communication media recipient devices 120-135 can send and receive communications to and from the service provider system 105.

Importantly, while referred to herein as a recipient device or an initiating device for the sake of explanation, any device coupled with the service provider system 105 can potentially, at various times, act as either an initiating device or a recipient device. For example, a particular cell phone may at one point initiate a call but at another time may receive a call. Therefore, the labels of initiating device and recipient device are illustrative only and indicate only a particular device's function at a specific point in time rather than indicating any limits on its functionality overall.

In use, the service provider system 105 can receive a request to initiate a communication from an initiating device 110. For example, the service provider system may receive a phone call or email from an initiating device 110. The request can identify an intended recipient device 120 by, for example, a phone number email address IP address, etc. According to one embodiment, in response to receiving the request, the service provider system 105 can select a greeting from a set of pre-determined greetings stored in the user profile database 115. The greeting can be stored, for example, by a user of the recipient device 120. Alternatively or additionally, a set of default or standard greetings can be provided by the service provider.

According to one embodiment, the service provider system 105 can select a greeting from the set of predetermined greetings based on an identity of a user of the initiating device 110. That is, a greeting can be selected based on who is calling or sending a communication. In some cases, selection can be also based on membership of the user of the initiating device 110 in a group defined in the user profile information from the user of the recipient device 120. That is, selection of a greeting or message can be based on the caller or sender of the communication being, for example, a member of the recipient's "friends" group or "work" group as defined in the recipients profile information According to another embodiment, the service provider system 105 can select a plurality of possible greetings from the set of pre-determined greetings from or for the user of the recipient device 120 stored in the user profile database 115. In such a case, the service provider system 105 can, prior to generating the response message to the initiating device 110, providing notification of the request to the recipient device 120. Such notification can be provided, for example, as described in the above referenced co-pending application entitled "Cross-Platform Message Notification" and/or the above referenced co-pending application entitled "Cross-Platform Redirection of Communications." The notification can include an indication of each of the plurality of the possible greetings. That is, a number of possible greetings or messages can be selected from greetings or messages defined in the recipients profile. The notification of an incoming communication can be sent by the service provider system 105 to the recipient device 120 to inform the user of that device 120 of the communication and provide, as options, the possible greetings or messages. A selection of one of the plurality of the possible greetings can be received by the service provider system 105 from the user of the recipient device 120.

Regardless of whether the greeting or message is selected automatically by the service provider system 105 based on information from the user profile database 115 related to the recipient or interactively based on a selection from the user of the recipient device 120, a response message to the initiating device 110 can be generated by the service provider system 105. The response message can include an indication of the selected greeting. The indication can be, for example, a pointer, address, of other indication of a location of the selected greeting or the greeting itself. The response message can then be sent by the service provider system 105 to the initiating device 110.

Therefore, the user of the recipient device 120 can define a number of possible greetings and store these greetings in the user profile database 115. Additionally or alternatively, a number of standard or default greetings can be stored in the user profile database 115 for each user. These greetings can be used for more than one device associated with the recipient such that the user of the recipient device 120 can affect a change in the greetings used by all his devices by changing his profile in the user profile database 115. Furthermore, the greetings can be associated with specific individuals or groups of individuals. Thus, the user can define, for example, a greeting for his friends and another greeting for his business associates and these greetings will be commonly available on all of the user's devices.

Alternatively, another architecture that provides support for communications between a number of different devices of different types may be used to provide the same functions. Such an architecture is described in the above referenced, co-pending U.S. Patent Application titled "Cross Platform Support for a Variety of Media Types." While not necessary to implement various embodiments of the present invention, such an architecture is considered useful with embodiments of the present invention since it provides a communication bus that in turn provides a common representation, in the form of a number of common language messages, of services or information available to, from, and between end devices regardless of the type of end device or the server providing or receiving the information or service. For example, one of these common language messages can be used to provide notification of communications and respond with a selected greeting. Furthermore, the architecture includes a central user profile database that can be used to store information related to selectable greetings such as discussed above. An overview of this architecture is now provided for convenience.

Figure 2:
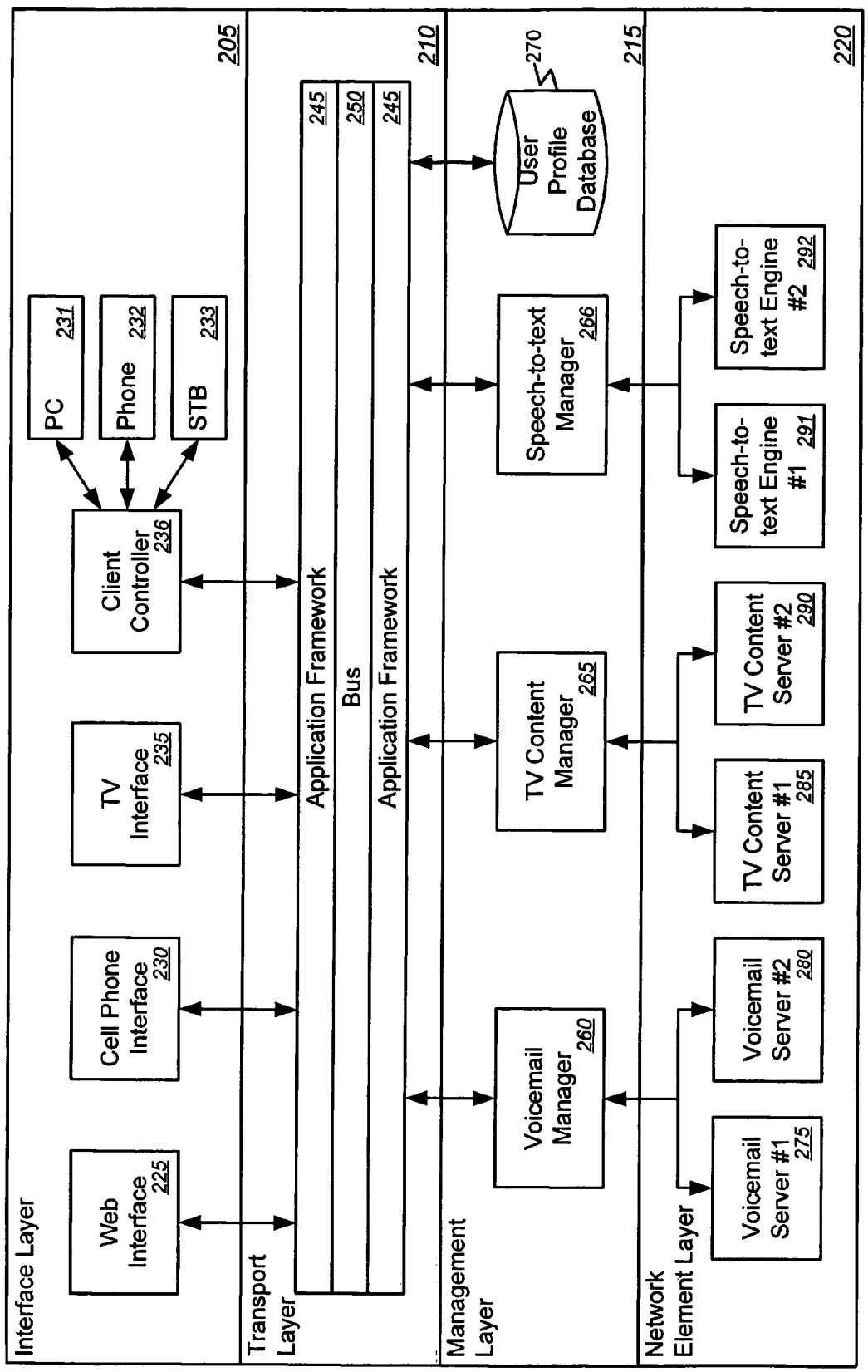
FIG. 2 is a block diagram illustrating functional component of an architecture for providing selectable greetings in response to a request to initiate a communication according to an alternative embodiment of the present invention.

FIG. 2 is a block diagram illustrating functional component of an architecture for providing selectable greetings in response to a request to initiate a communication according to an alternative embodiment of the present invention. In this example, the architecture is logically divided into four layers 205-220. The layers 205-220 include a network element layer 220, a management layer 215, a transport layer 210, and an interface layer 205. As will be seen, elements of each layer 205-220 can be communicatively coupled with elements of the next layer 205-220. So, elements of the network element layer 220 can be communicatively coupled with elements of the management layer 215 which in turn can be communicatively coupled with elements of the transport layer 210, etc.

The network element layer 220 can comprise one or more servers 275-292. The servers 275-292 of the network element layer 220 can each provide content and/or services of one or more types. For example, one or more servers 275 and 280 may provide voicemail services while one or more other servers 285 and 290 provide television (TV) content services, while yet other servers 291 and 292 provide speech-to-text services, etc. Importantly, while this example shows a limited number of servers 275-292 in the network element layer 220, many more servers, providing a wide range of content or services of various types may be included. For example, one or more servers may be included for providing Internet services, Email services, and various other types of data, communication, and/or entertainment services.

The management layer 215 can comprise one or more managers 260-266. Each manager 260-266 can be communicatively coupled with one or more of the servers 275-292 of the network element layer 220. For example, voicemail manager can be coupled with voicemail servers 275 and 280 while TV content manager 265 can be coupled with TV content servers 285 and 290. Importantly, while managers 260-266 and servers 275-292 are shown and described herein as being organized by or arranged per service, other arrangements are contemplated and considered to be within the scope of the present invention. According to one alternative, the managers 260-266 and the servers 275-292 may be arranged by company or provider. So, for example, one manager may be coupled with and provide access to the services and content provided by the servers of company A while another manager may be coupled with and provide access to the services and content provided by the servers of company B. However, an arrangement of managers 260-266 and servers 275-292 based on service and/or content type may be preferable since, as will be seen, such an arrangement can provide for easier extensibility of the system when adding features or services.

Furthermore, as noted above, additional servers may be used in the network element layer providing additional services and/or content of different types. Therefore, more, fewer, or different managers than shown in this example may be used in an actual implementation. For example an additional manager may be used for interfacing with one or more servers providing Internet services or email services. In another example, one or more managers may be communicatively coupled with one or more servers tracking billable events on the architecture. That is, one manager may track calls, messages, events, or pay-per-view or other content billed on a per-use basis so that the appropriate users can be billed by the operator of the architecture, the provider of the content, and/or other parties.

Regardless of the exact number, nature, or organization of the servers 275-292 and managers 260-266, the managers 260-266 can be adapted to translate content of the servers 275-292 with which the manager 260-266 is connected from the media types of the servers 275-292 to one or more common language messages. That is, the managers 260-266 can provide translation from a service specific format to a common or generic format. For example, voicemail server #1 275 and voicemail server #2 280 may be operated by different entities and offer different information in different formats that may be completely incompatible with each other. However, voicemail manager 260 provides for translating these different functions, formats, etc into a common language message that can be used by all other elements of the architecture.

According to one embodiment of the present invention, the managers 260-266 can provide defined interfaces to the servers 275-292 of the network element layer 220. By using calls, invocations, requests, or other signals or messages to the managers 260-266, the servers 275-292 can pass content or messages to the managers 260-266 for translation to a common language message for transmission to another element of the architecture. For example, voicemail manager 260 may provide an Application Program Interface (API) for use by any voicemail server 275 and 280 connected with the voicemail manager 260. Voicemail servers 275 and 280 can then use API calls to the voicemail manager 260 to initiate services, pass content or other information, and/or otherwise communicate with the voicemail server 260. According to one embodiment of the present invention, calls to the API or other interface may be closely analogous to the common language messages generated by the manager. For example, as will be described in detail below, the manager may generate an "InitiateCommunication" message to initiate a communication. The manager's API may also provide an "InitiateCommunication" or other similar call to the servers to which it is connected through which the servers can initiate a communication.

While use of an API or other defined interface between the managers 260-266 and the servers 275-292 is not required, it may be preferred since, by using an API or other type of defined interface, the managers 260-266 can be easily extended or modified as services and/or content of the servers are added or changed or as new servers are added. That is, the use of a defined interface such as an API allows greater extensibility since the only changes made at the manager would be to add or modify an appropriate "stub," module, or routine to add a new server, service, or content type without a need to make wholesale changes or re-write the managers.

According to one embodiment of the present invention, the manager and the API or interface of the manager may be implemented using object-oriented programming techniques. In such a case, the manager API calls made by the servers can cause the stub or module of the manager interfacing with the server to instantiate an object of a particular class type, such as a "InitiateCommunication" object, with properties representing, among other possibilities, the content of data to be communicated, the intended recipient(s), etc. Such an object or common language message may be defined in a common format readable by other elements of the architecture. For example, the object may be defined in an eXtensible Markup Language (XML) file. The manager can then transmit this object or common language message to any or all of the other elements of the architecture via the transport layer 210.

The transport layer 210 can comprise a communications bus 250 communicatively coupled with each of the managers 260-266. The bus 250 can be adapted to receive and transport the one or more common language messages from the managers 260-266. The transport layer 210 can also comprise an optional application framework 245 interposed between the end devices 225-236 of the interface layer 205 and the communications bus 250 and between the managers 260-266 and the communications bus 250. Generally speaking, the application framework 245 provides for monitoring and tracking of the common language messages placed on the bus 250 of the transport layer 210.

Regardless of whether the application framework 245 is used, the bus 250 of the transport layer 210 comprises a common representation of data that is usable by all elements of the architecture. Furthermore, the bus 250 provides this message to any or all devices in the architecture as appropriate regardless of the type of device.

According to one embodiment of the present invention, the bus 250 may also be implemented using object-oriented programming techniques. In such a case, a manager placing or sending a common language message on the bus 250 can call or invoke an API or other interface of the bus 250 or otherwise cause the instantiation of an object of a particular class type, such as an "InitiateCommunication" object, with properties representing, among other possibilities, the content of data to be communicated, the intended recipient(s), etc. The bus can then make this object or common language message available to any or all of the other elements of the architecture.

The interface layer 205 of the architecture can comprise one or more end devices 225-236 of different types. For example, the end devices 225-236 can represent a cell phone 230, a web browser 225, a TV interface 235, etc all potentially operating on different platforms with different operating systems. Each end device 225-236 can be communicatively coupled with the bus 250 of the transport layer, either directly or via the application framework 245, and can be adapted to receive and translate the common language messages to a format specific to the end device based on its type.

Alternatively or additionally, one or more of the end devices may comprise a client controller 236 communicatively coupled with the bus 250 of the transport layer 210 and one or more other end devices 231-233 such as a personal computer 231, television Set-Top Box (STB) 233 for television service, telephone 232, or other type of device. If used, the client controller 236 can be adapted to receive common language messages from the bus 250, translate content from the common language messages to a format specific to the end device(s) 231-233 for which it is intended, and deliver the device specific message to the device or devices. In some cases, the client controller 236 may also be adapted to act as a firewall for end devices 231-233 communicating via the bus 250 of the transport layer 210.

Therefore, the end devices 225-236 can translate from the common language messages, such as an XML message, to device specific representations of the information in that message for presentation to user in whatever format that device uses. According to one embodiment, the translation functions of the end devices can also be implemented using object-oriented programming techniques. In such a case, the end devices receive the common language messages such as XML encoded representations of the objects on the bus 250 of the transport layer 210. Translation can therefore comprise instantiating on the end device an object of the class indicated by the message with the properties indicated by the message thereby translating the properties of the object on the bus to a presentation language of the device.

Thus far, the description of the architecture has focused on messages from the servers 275-292 to the end devices 225-236. However, the end devices 225-236 can also be adapted to generate one or more common language messages based on user input and send the one or more common language messages to one or more of the managers 260-265 via the bus 250. For example, a cell phone 230 or other end device 225-236 can generate an "InitiateCommunication" message to be sent to any or all of the managers 260-265 or even to another end device. Therefore, the managers 260-265 can be further adapted to receive the common language messages from the end devices 225-236 via the bus 250 and to translate the common language messages to content of the media type of the servers 275-292 with which the manager 260-266 is connected.

According to one embodiment of the present invention, the architecture can include a user profile database 270 communicatively coupled with the bus 250 of the transport layer. The user profile database 270 can be adapted to maintain records of a set of user preferences for one or more of the end devices 225-236 of the interface layer 205. For example, TV or cell phone settings or options for a particular device and/or a particular user can be stored in the user profile database 270 for retrieval by one or more of the end devices 225-236 or one or more of the managers 260-266. Therefore, the user profile database 270 can be adapted to provide the preferences to one or more of the end devices 225-236 or one or more of the managers 260-266 in response to a common language message received via the bus 250. In another example, the user profile database 270 can be adapted to store information related to one or more greetings as well as individuals or groups of individuals associated with each greeting.

Therefore, in use, the bus 250 provides a common representation of services or information available to, from, and between the end devices 225-236 regardless of the type of end device or the server providing or receiving the information or service. This common representation is in the form of a number of common language messages. The type, number, format, etc. of the common language messages can vary widely depending upon the exact implementation without departing from the scope of the present invention. However, for illustrative purposes only, some exemplary messages will be described.

According to one embodiment, the common language messages can include an "InitiateCommunication" request message indicating a request to initiate a communication. Similarly, the common language messages can include an "InitiateCommunication" response message acknowledging initiation of a communication. As will be discussed in greater detail below, "InitiateCommunication" request and response messages can be used to request a communication and/or provide notification of a communication and possible greetings to that communication as well as responding with a selected greeting. Alternatively or additionally, a separate communication notification message can be used to provide notification of a communication and/or a selected greeting. According to another embodiment, the common language messages can include a "Communication Information" request indicating a request for information relating to a communication and a "Communication Information" response providing requested information. The common language messages can also include a "Communication Event Notification" message indicating the occurrence of a communication.

In some cases, the common language messages can include an "Update Profile" message indicating a change to one or more user defined preferences. As indicated above, such a message can be useful in updating one or more entries in the user profile database 170. Furthermore, such a message may be useful in informing other devices of a change. An "Update Profile" message may be used, for example, when defining greetings and/or individuals or groups associated with each greeting. Additionally or alternatively, the common language messages can include a "Get Profile" message used to read the profile information of a particular user.

The various types of message can take any of a variety of possible formats without departing from the scope of the present invention. However, for illustrative purposes only, an exemplary format for a message may be considered to include a header and a body. The header may include information such as any or all of: an address or other indication of the device or devices for which the message is intended; an address or other indication of the device originating the message; an indication of the message type; an indications of the type of contents in the message; etc. The message body may include information such as representation of or actual content to be transferred. Therefore, the body can contain an email message, an audio or video file, a hyperlink or other direction to a location of the actual content, etc. However, once again, the exact format of the common language messages can vary widely depending on the exact implementation.

Regardless of the exact format, translating content to a common language message or generating a common language message can comprise generating a file, such as an XML file, of the appropriate format to indicate the type of message and the end devices for which it is intended and possibly an indication of the contents. Alternatively, as indicated above, various components of the architecture may be implemented using object-oriented programming techniques. In such a case, generating a common language message can comprise instantiating an object of a particular class type, such as a "InitiateCommunication" object, with properties representing, among other possibilities, the content of data to be communicated, the intended recipient(s), etc.

According to one embodiment, the common language messages can include an "InitiateCommunication" request message indicating a request to initiate a communication. Such a message can be initiated by one of the end devices 232 and sent via the bus 250 of the transport layer 210 to a manager 260 with a server 275 providing a service to the intended recipient end device 230. Upon receiving the message, the server 275 or manager 260 can select a greeting from a set of pre-determined greetings stored in the user profile database 270, for example, via a "Get Profile" or other message. The greeting can be stored, for example, by a user of the recipient device 230 via an "Update Profile" or other message. Alternatively or additionally, a set of default or standard greetings can be provided by the service provider.

According to one embodiment, the manager 260 can select a greeting from the set of pre-determined greetings based on an identity of a user of the initiating device 232. That is, a greeting can be selected based on who is calling or sending a communication. In some cases, selection can be also based on membership of the user of the initiating device 232 in a group defined in the user profile information from the user of the recipient device 230. That is, selection of a greeting or message can be based on the caller or sender of the communication being, for example, a member of the recipient's "friends" group or "work" group as defined in the recipients profile information According to another embodiment, the manager 260 can select a plurality of possible greetings from the set of pre-determined greetings from or for the user of the recipient device 230 stored in the user profile database 270. In such a case, the manager 260 can, prior to generating the response message to the initiating device 232, providing notification of the request to the recipient device 230. Such notification can be provided, for example, as described in the above referenced co-pending application entitled "Cross-Platform Message Notification" and/or the above referenced co-pending application entitled "Cross-Platform Redirection of Communications." The notification can include an indication of each of the plurality of the possible greetings. That is, a number of possible greetings or messages can be selected from greetings or messages defined in the recipients profile. The notification of an incoming communication can be sent by the manager 260 to the recipient device 230, for example, via an "InitiateCommunication" request, "Communication Event Notification", or other message, to inform the user of that device 230 of the communication and provide, as options, the possible greetings or messages. A selection of one of the plurality of the possible greetings can be received by the manager 260 from the user of the recipient device 230, for example, via an "InitiateCommunication" reply, "Communication Event Notification", or other message.

Regardless of whether the greeting or message is selected automatically by the manager 260 based on information from the user profile database 270 related to the recipient or interactively based on a selection from the user of the recipient device 230, a response message to the initiating device 232, such as an "InitiateCommunication" reply or other message, can be generated by the manager 260. The response message can include an indication of the selected greeting. The indication can be, for example, a pointer, address, of other indication of a location of the selected greeting or the greeting itself. The response message can then be sent by the manager 260 to the initiating device 232.

Therefore, the user of the recipient device 230 can define a number of possible greetings and store these greetings in the user profile database 270. Additionally or alternatively, a number of standard or default greetings can be stored in the user profile database 270 for each user. These greetings can be used for more than one device associated with the recipient such that the user of the recipient device 230 can affect a change in the greetings used by all his devices by changing his profile in the user profile database 270. Furthermore, the greetings can be associated with specific individuals or groups of individuals. Thus, the user can define, for example, a greeting for his friends and another greeting for his business associates and these greetings will be commonly available on all of the user's devices.

Figure 3:
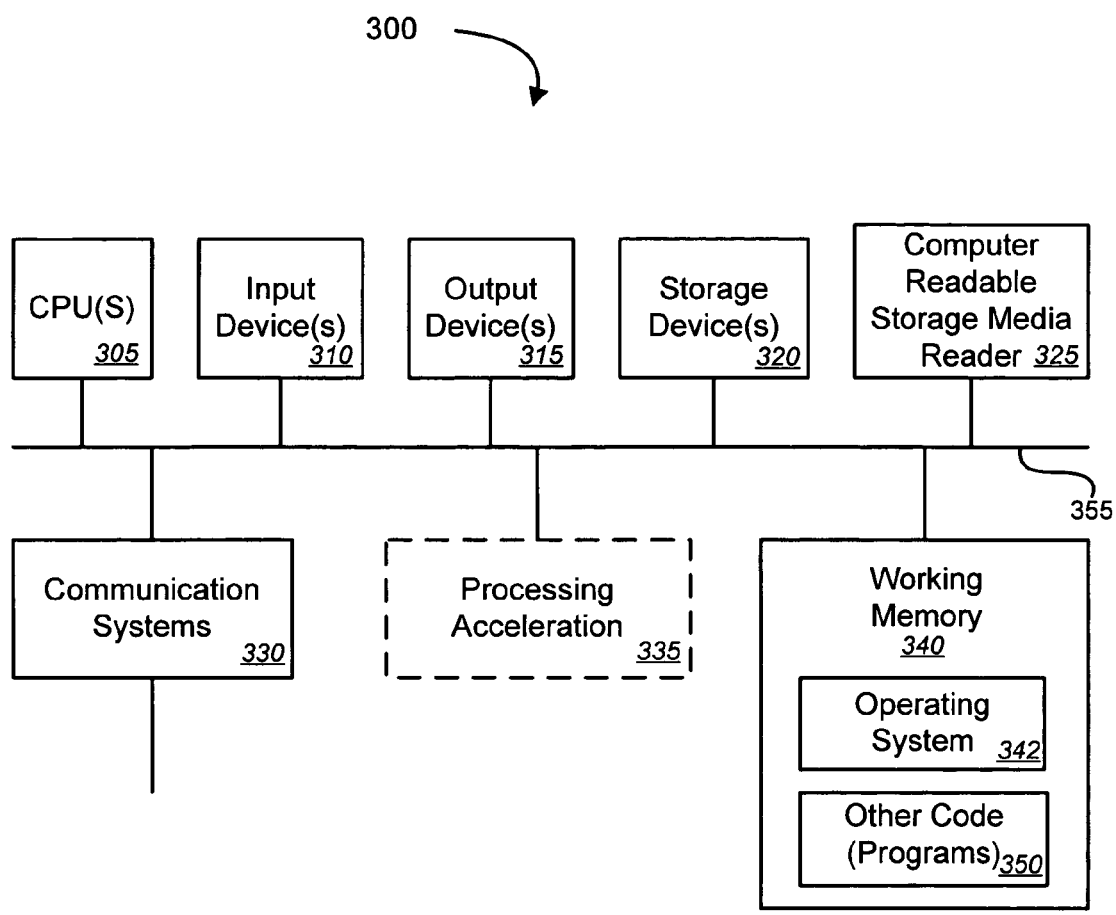
FIG. 3 is a block diagram illustrating an exemplary computer system in which embodiments of the present invention may be implemented.

FIG. 3 is a block diagram illustrating an exemplary computer system in which embodiments of the present invention may be implemented. This example illustrates a computer system 300 such as may be used, in whole, in part, or with various modifications, to provide various components of the systems discussed above.

The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 445 and/or other code 350. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code 350 for implementing any or all of the function of the various elements of the architectures as described herein. For example, software, stored on and/or executed by a computer system such as system 300, can provide the functions of the service provider system, a manager, an end device, etc. Methods implemented by software on some of these components will be discussed in detail below with reference to FIGS. 6 and 7.

As noted above, the service provider system or manager may automatically select a greeting with which to reply to the initiator based on the recipients profile information. In other cases, the service provider system or manager may provide a number of possible greetings to the recipient for selection of a greeting. In such a case, a notification of the incoming communication along with possible greetings can be supplied to the recipient. While the exact form or appearance of such a notification as well as the manner in which the recipient interacts with the recipient device can vary widely, an exemplary interface will now be discussed for illustrative purposes.

Figure 4:
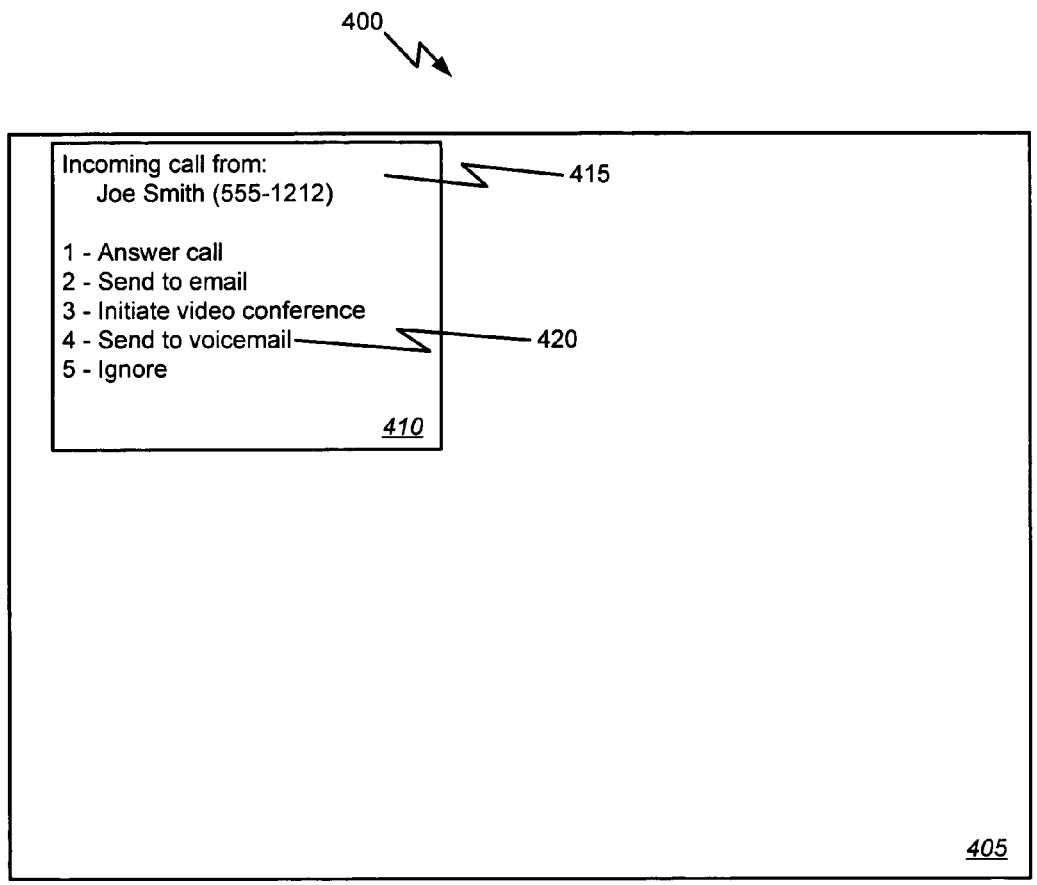
FIG. 4 illustrates an exemplary user interface for informing a user of a communication and presenting options for handling the communication according to one embodiment of the present invention.

FIG. 4 illustrates an exemplary user interface for informing a user of a communication and presenting options for handling the communication according to one embodiment of the present invention. In this example, a user interface 400 is shown such as may be displayed by a, cell phone display, web browser, other personal computer application, or similar display of a recipient device in response to receiving a notification from a manager or service provider system. According to one embodiment of the present invention, when a notification is received that a communication is pending, such as receiving a phone call or other communication, a notification can be displayed on the interface 400. In this example, the notification is in the form of a pop-up 410 displayed in the display area 405 of the interface. In other cases, the notification can take other forms. For example, the notification may be presented as a ticker, a new application window, an icon on the display area 405 or taskbar, or any other type of audio and/or visual indication to the user.

Regardless of exactly how the notification is displayed, it can, according to one embodiment of the present invention, include an indication 415 that a communication is being received. In this example, the indication 415 is in the form of a line of text in the pop-up 410 indicating "Incoming call" and a name and number for the originator of the communication. In other cases, the indication may indicate another type of communication and/or include a photograph, etc. of the originator, and/or other information. Additionally, a list of options 420 for handling the communication can be included in the pop-up 410 or other notification. In this example, the list includes a number for each option that can be pressed or selected through an input for the recipient device by the user to select an option indicated by the text. For example, the number 1 indicating "Answer call" can be pressed on a keypad of the recipient device by the user to accept the communication.

It should be understood that the format, appearance, content, etc. of the user interface can vary widely without departing from the scope of the present invention. For example, the interface can and likely would vary depending upon the device upon which it is presented. For example, a PC interface will look different from the interface presented by a cell phone, TV, PDA, pager, etc. Furthermore, the way in which notification is given and options presented can vary significantly without departing from the scope of the present invention. For example, rather than a numbered list of options as shown in FIG. 4, options may be presented as clickable buttons or icons, a series of verbal instructions such as "To answer the call press 1", or any other type of audio, visual, tactile or other sensory indication.

Figure 5:
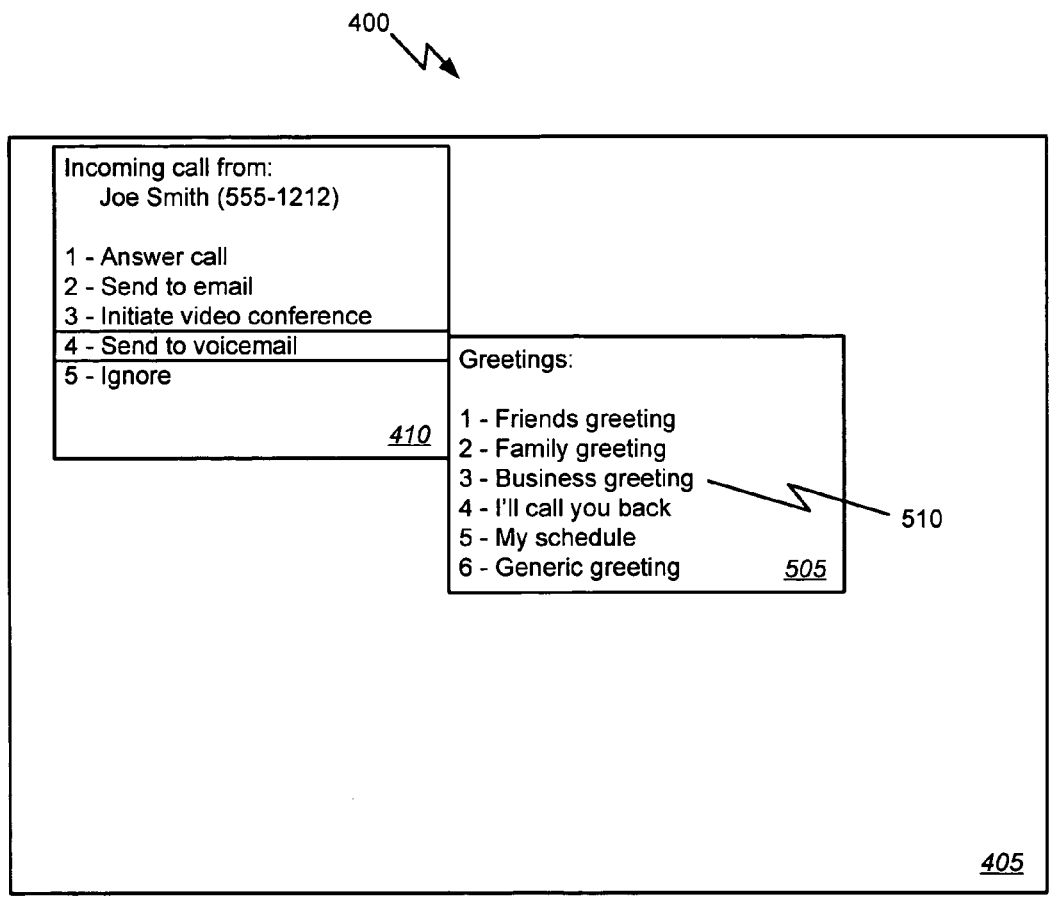
FIG. 5 illustrates an exemplary user interface for informing a user of a communication and presenting selectable greetings according to an alternative embodiment of the present invention.

FIG. 5 illustrates an exemplary user interface for providing selectable greetings according to an alternative embodiment of the present invention. In this example, the user interface 400 discussed above with reference to FIG. 4 is shown after the user has selected the send to voicemail option. As a result, a new pop-up 510 is displayed presenting indications of a number of different greetings. The user can then select one of these greetings to be returned or played to the initiating device. For example, the possible greetings presented here include a "friends greeting", a "family greeting", a "business greeting", an "I'll call you back greeting", a "my schedule greeting", and a "generic greeting". It should be understood that the greetings and there titles can vary widely and may, in some cases be user defined. For example, a user may record a greeting such as "I am busy now but I will call you back as soon as possible" and title it "I'll call you back." Alternatively, some titles, such as "business greeting" may be predefined by the service provider. In such a case, the use may use the default title and simply record an appropriate greeting.

The exact manner in which the user selects an option as well as the format and/or content of the notification can vary depending upon the type of device on which the notification is displayed and/or the type of input device used. For example, if displayed on a cell phone display or television screen, an option can be selected through the keypad of the phone or remote control of the television by pressing the corresponding number. In other cases, the keypad may provide some cursor controls, such as arrow keys, to allow the user to navigate through the options. In such a case, the notification can have a different format suitable for use with that device.

Furthermore, it should be noted that, while the greeting options are illustrated here as a submenu of other communication handling options, in other implementations the greeting options may be presented as a single or main menu. That is, rather than being dependent on or subordinate to other communication handling features, the selectable greetings or messages described herein may, in some cases be implemented as a stand-alone feature. In such a case, the only interface presented to the user of the recipient device may be that presenting the greeting options.

Figure 6:
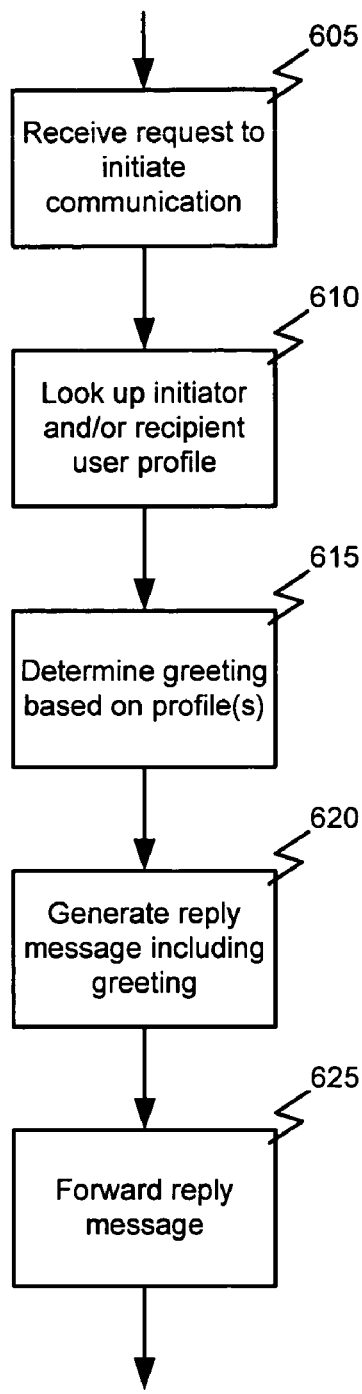
FIG. 6 is a flowchart illustrating a process for providing selectable greetings in response to a request to initiate a communication according to one embodiment of the present invention.

FIG. 6 is a flowchart illustrating a process for providing selectable greetings in response to a request to initiate a communication according to one embodiment of the present invention. This example represents a process that may be performed by the service provider system discussed above with reference to FIG. 1, one or more of the servers or managers of the management or network element layers discussed above with reference to FIG. 2, or another system or device depending upon the environment in which the methods are implemented.

In this example, the implementing system can receive 605 a request to initiate a communication from an initiating end device. The request can identify an intended recipient device. Receiving a request to initiate a communication can comprises receiving a phone call to a single phone number, receiving a message to a single address such as an email message or an Instant Message (IM), etc. Based on this request, the system can lookup or read 610 user profile information for the initiator and/or the recipient.

A greeting can be selected 615 from a set of pre-determined greetings. The greetings can be stored, for example, in user profile information from a user of the recipient device. According to one embodiment, greeting can be selected from the set of pre-determined greetings based on an identity of a user of the initiating device, i.e., based on who is calling or sending a communication. In some cases, selection can be also based on membership of the user of the initiating device in a group defined in the user profile information from the user of the recipient device. That is, selection of a greeting or message can be based on the caller or sender of the communication being, for example, a member of the recipient's "friends" group or "work" group as defined in the recipients profile information.

A response message to the initiating device can be generated 620 where the response message indicates the selected greeting. The response message can be sent 625 to the initiating device.

Therefore, the greeting can be selected automatically from among one or more possible greetings stored the recipient's profile. Alternatively, as will now be illustrated, a plurality of possible greetings can be provided to the user of the recipient device for interactive selection of the greeting.

Figure 7:
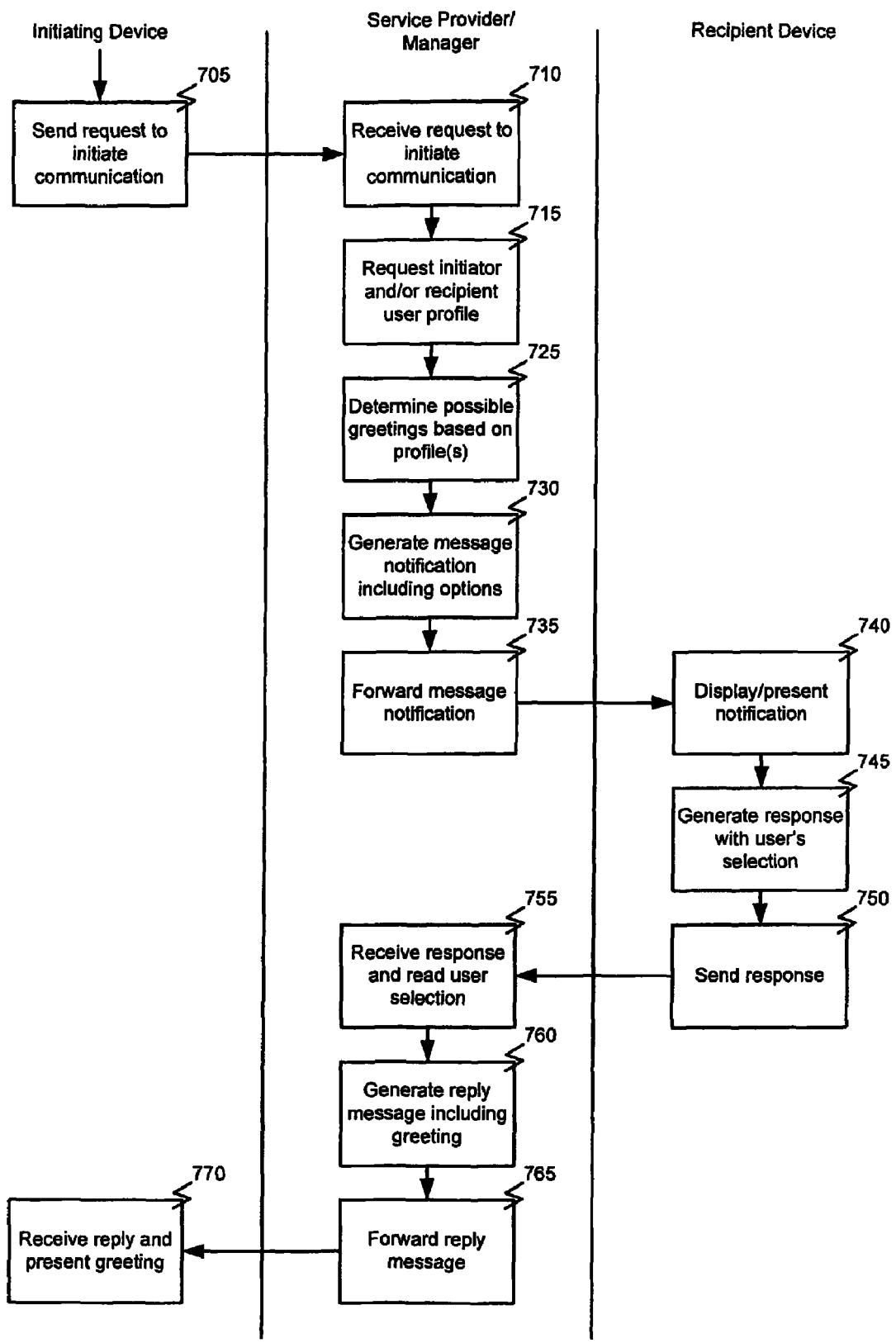
FIG. 7 is a flowchart illustrating additional details of a process for providing selectable greetings in response to a request to initiate a communication according to another embodiment of the present invention.

FIG. 7 is a flowchart illustrating additional details of a process for providing selectable greetings in response to a request to initiate a communication according to another embodiment of the present invention. This example represents a process that may be performed by the service provider system discussed above with reference to FIG. 1, one or more of the servers or managers of the network element layer discussed above with reference to FIG. 2, or another system or device depending upon the environment in which the methods are implemented and illustrates the processes performed by the initiating device as well as the recipient device.

As illustrated in FIG. 7, the initiating device sends 705 a request to initiate a communication, such as an "InitiateCommunication" request or other message, to the service provider system or server as described above. The implementing system, such as a service provider system or manager, can receive 710 the request to initiate a communication from the initiating end device. The request can identify an intended recipient device, for example by an address, phone number, etc. Receiving a request to initiate a communication can comprises receiving a phone call t, receiving a message such as an email message or an Instant Message (IM), etc. Based on this request, the system can lookup or read 715 user profile information for the initiator and/or the recipient via, for example a "Get Profile" or other message.

Based on the profile information a plurality of possible greetings can be selected 725 from the set of pre-determined greetings. A notification message, such as an "InitiateCommunication" request, "Communication Event Notification", or other message, can be generated including an indication of the plurality of possible greetings. The indication of the plurality of possible greetings can comprise a list of names or titles, a pointer or pointers to such names or titles or the greetings themselves, or some other indication. This message can then be forwarded 735 or sent to the recipient device.

The recipient device can display 740 or otherwise present the notification and greeting options to the user of the recipient device. Upon selection of a greeting by the user, a response message, such as an "InitiateCommunication" response, "Communication Event Notification, or other message, can be generated 745 and sent 750 by the recipient device to the service provider system or manager. Alternatively or additionally, if the user of the recipient device does not make a selection within a predetermined time, the notification may timeout and a default or other greeting may be automatically selected by the service provider system or manager as illustrated in FIG. 6.

A selection of one of the plurality of the possible greetings can be received 755 from the user of the recipient device. A response message to the initiating device can be generated 760. The response message can include an indication of the greeting selected by the user of the recipient device. The reply can be forwarded 765 or sent to the initiating device, such as via an "InitiateCommunication" reply message or other message, to be received 770 and presented to the user of the initiating device.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing selectable greetings in response to a request to initiate a communication, the method comprising:

maintaining, with a user profile database communicatively coupled with a communications bus, user profile information for a plurality of users;

sending, with an initiating device communicatively coupled with the communications bus, messages in a format specific to the initiating device via the communications bus;

storing, with the initiating device, first user profile information, about a user of the initiating device, in the user profile database;

sending and receiving common language messages with a recipient device via the communications bus;

translating, with the recipient device, common language messages received from the communications bus to a format specific to the recipient end device based on a type of the recipient device;

storing, with the recipient device, second user profile information, about a user of the recipient device, in the user profile database;

receiving, at a manager communicatively coupled with the communications bus, the request to initiate the communication from the initiating device, the request identifying the recipient device;

translating, with the manager, the request to initiate the communication from the format specific to the initiating device to the common language format;

in response to the translated request, selecting, with the manager, a greeting from a set of predetermined greetings in user profile information from a user of the recipient device;

generating a response message to the initiating device, the response message indicating the selected greeting; and sending the response message to the initiating device.

2. The method of claim 1, wherein selecting the greeting from the set of predetermined greetings is based on an identity of a user of the initiating device.

3. The method of claim 2, wherein selecting the greeting from the set of predetermined greetings is further based on membership of the user of the initiating device in a group defined in the user profile information from the user of the recipient device.

4. The method of claim 1, wherein selecting the greeting from a set of pre-determined greetings comprises selecting a plurality of possible greetings from the set of predetermined greetings.

5. The method of claim 4, further comprising, prior to generating the response message to the initiating device, providing notification of the request to the recipient device.

6. The method of claim 5 wherein, the notification comprises a presentation of an icon.

7. The method of claim 6 wherein, the notification further comprises, a name and number for the originator of the communication; and a list of options for handling the communication, the list of options comprising, answering the communication, and providing a greeting response to the communication.

8. The method of claim 7 wherein, the list of options comprises a series of audible instructions.

9. The method of claim 5, wherein the notification includes an indication of each of the plurality of the possible greetings.

10. The method of claim 9, further comprising, prior to generating the response message to the initiating device, receiving a selection of one of the plurality of the possible greetings from the user of the recipient device.

11. The method of claim 10, wherein generating the response message to the initiating device comprises generating a response message that includes an indication of the greeting selected by the user of the recipient device.

12. The method of claim 1 wherein, selecting a greeting comprises using a television remote control.

13. The method of claim 1 wherein, the greeting is selected automatically.

14. The method of claim 1 wherein, receiving a request to initiate a communication comprises receiving one of an email message and an Instant Message (IM).

15. A system for providing selectable greetings in response to a request to initiate a communication, the system comprising:

a communications bus;

a user profile database communicatively coupled with the communications bus, wherein the user profile database maintains and adapted to maintain user profile information for a plurality of users;

an initiating end device communicatively coupled with the communications bus, wherein the initiating end device (i) sends messages in a format specific to the initiating end device via the communications bus, and (ii) stores first user profile information, about a user of the initiating end device, in the user profile database;

a recipient end device communicatively coupled with the communications bus, wherein the recipient end device (i) sends and receives common language messages via the communications bus, (ii) translates common language messages received from the communications bus to a format specific to the recipient end device based on a type of the recipient end device, and (iii) stores second user profile information, about a user of the recipient end device, in the user profile database; and a manager communicatively coupled with the communications bus, wherein the manager (i) receives the request to initiate the communication from the initiating end device, the request identifying the recipient end device, (ii) translates the request to initiate the communication from the format specific to the initiating end device to the common language format, and (iii) in response to the translated request, selects a greeting from a set of predetermined greetings in user profile information from a user of the recipient end device.

16. The system of claim 15, wherein the manager further generates a response message to the initiating end device, the response message indicating the selected greeting, and sends the response message to the initiating end device.

17. The system of claim 16 wherein, the response message comprises one of a pointer and an address of the selected greeting.

18. The system of claim 15, wherein the manager selects the greeting from the set of pre-determined greetings based on an identity of a user of the initiating end device.

19. The system of claim 18, wherein the manager further selects the greeting from the set of pre-determined greetings based on membership of the user of the initiating end device in a group defined in the user profile information from the user of the recipient end device.

20. The system of claim 15, wherein the manager further selects a plurality of possible greetings from the set of pre-determined greetings.

21. The system of claim 20, wherein the manager further provides notification of the request to the recipient end device.

22. The system of claim 21, wherein the notification includes an indication of each of the plurality of the possible greetings.

23. The system of claim 22, wherein the manager further receives a selection of one of the plurality of the possible greetings from the user of the recipient end device.

24. The system of claim 23, wherein the manager further generates a response message to the initiating end device, wherein the response message includes an indication of the greeting selected by the user of the recipient end device.

25. The system of claim 24, wherein the manager further sends the response message to the initiating end device.

26. The system of claim 15 wherein, the manager further (i) provides notification of the request to initiate a communication to the recipient end device, and (ii) selects a greeting from a set of pre-determined greetings based upon a response received from the recipient device.

27. The system of claim 15 wherein, the recipient end device comprises one of a plurality of recipient end devices, each of the plurality of recipient end devices being adapted to modify the set of pre-determined greetings in the user profile information in the user profile database.

* * * * *